C. W. EBERT.
GRAB HOOK.
APPLICATION FILED FEB. 8, 1910.
960,522.
Patented June 7, 1910.
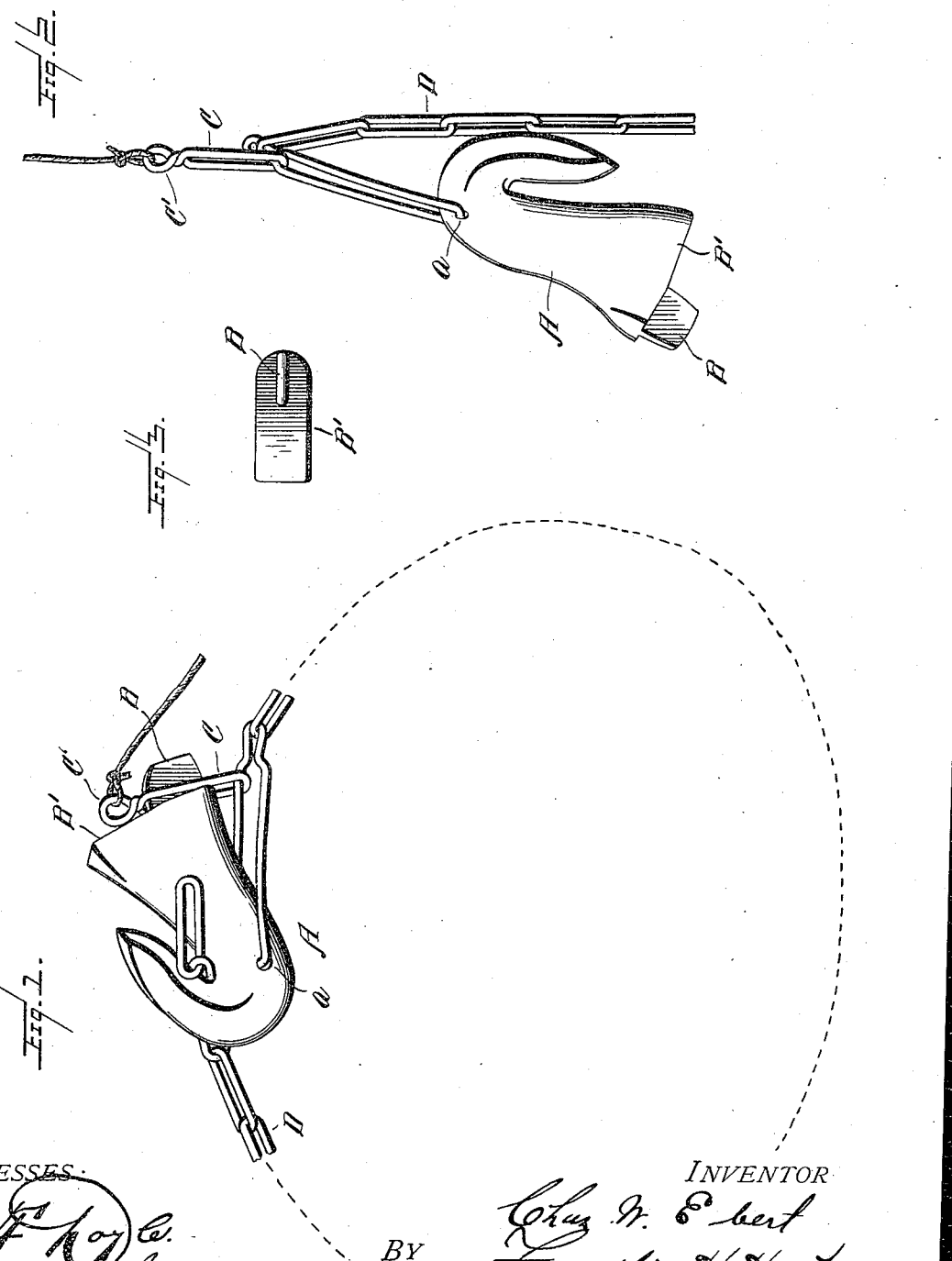

UNITED STATES PATENT OFFICE.

CHARLES W. EBERT, OF MERRILL, WISCONSIN.

GRAB-HOOK.

960,522.   Specification of Letters Patent.   Patented June 7, 1910.

Application filed February 8, 1910. Serial No. 542,753.

*To all whom it may concern:*

Be it known that I, CHARLES W. EBERT, a citizen of the United States, residing at Merrill, in the county of Lincoln and State of Wisconsin, have invented certain new and useful Improvements in Grab-Hooks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in trip grab hooks for chains, designed for use in connection with logging, etc., and the object in view is to produce a simple and efficient device of this nature which is so constructed and arranged that the hook may be readily detached from the link of a chain without endangering the life or limb of the operator.

The invention comprises various details of construction, combinations and arrangements of parts which will be hereinafter fully described and then specifically defined in the appended claims.

I illustrate my invention in the accompanying drawings, in which:—

Figure 1 is a perspective view showing the hook held in its engaging relation to the link of a chain, and Fig. 2 is a similar view showing the hook released. Fig. 3 is an end view of the butt end of the hook.

Reference now being had to the details of the drawings by letter, A designates a hook which may be of any desirable size and shaped, preferably, as shown in the drawings, being provided with a tenon or lug B which projects from the shank portion of the hook preferably adjacent to one edge thereof. The butt or lug carrying end of the shank is preferably widened, as at B', for the purpose which will be presently described. A chain, designated by letter D, is fastened in an aperture $a$ in said hook and to said chain is connected a trip link C designed to engage over the lug or tenon B, as shown in Fig. 1 of the drawings, in which position the hook may be held in engagement with the link of a chain. Said trip link has an eye C' formed in one end thereof and to which a string or rope may be fastened for convenience in releasing said trip link from the lug B when it is desired to detach the hook from one of the links of the chain. When the trip link is in engagement with said lug, it will rest upon the end of the shank portion of the hook upon either side of the lug and, owing to the width of the end of the hook carrying said lug, the eye upon the trip link will be protected and be prevented from being engaged accidentally by the chain being held by the hook.

In operation, when a chain equipped with my improved releasing device and hook is applied about a load of logs or other articles and when it is desired to release the chain, it may be readily done by the operator pulling upon the rope to which is connected the trip link which will cause the latter to be withdrawn from the lug upon the hook and allow the latter to fall down into the position shown in Fig. 2 of the drawings. This operation may be accomplished without the operator being in danger of injury from falling logs when the chain is released.

What I claim to be new is:—

1. In combination with a chain, a trip grab hook connected thereto, one end of said hook having a widened portion with a lug projecting therefrom, a trip link connected to said chain and engaging said lug, and releasing means connected to said trip link, as set forth.

2. In combination with a chain, a trip grab hook connected thereto, one end of said hook having a widened portion with a lug projecting therefrom, a trip link connected to said chain and engaging said lug, one end of said trip link turned to form an eye, and a releasing cord connected to said eye, as set forth.

3. In combination with a chain, a trip grab hook connected thereto, one end of said hook having a widened portion with a lug projecting therefrom, a trip link connected to said chain and adapted to engage over said lug and resting upon the ends of the shank portion of the hook, an eye formed at one end of said trip link, and a cord connected to said eye, as set forth.

4. In combination with a grab trip hook having its butt end widened and an integral lug projecting therefrom adjacent to its marginal edge, a chain connected to said hook, a trip link connected to said chain adapted to engage said lug, one end of the trip link formed into an eye which rests upon the widened end of the hook, as set forth.

In testimony whereof I hereunto affix my signature in the presence of two witnesses.

CHARLES W. EBERT.

Witnesses:
　THOMAS J. MATHEWS,
　LEWIS W. HEILMAN.